United States Patent

Bennett, III et al.

(10) Patent No.: US 8,705,701 B2
(45) Date of Patent: **\*Apr. 22, 2014**

(54) SECURITY SYSTEM WITH CALL MANAGEMENT FUNCTIONALITY

(75) Inventors: Raymond Walden Bennett, III, Naperville, IL (US); John Roland Beardsley, Rolling Meadows, IL (US)

(73) Assignee: AT&T Intellectual Property I, L.P., Atlanta, GA (US)

( \* ) Notice: Subject to any disclaimer, the term of this patent is extended or adjusted under 35 U.S.C. 154(b) by 72 days.

This patent is subject to a terminal disclaimer.

(21) Appl. No.: 13/307,527

(22) Filed: Nov. 30, 2011

(65) Prior Publication Data

US 2012/0069972 A1 Mar. 22, 2012

Related U.S. Application Data

(63) Continuation of application No. 11/605,675, filed on Nov. 29, 2006, now Pat. No. 8,107,594, which is a continuation of application No. 10/017,989, filed on Dec. 6, 2001, now Pat. No. 7,167,543, which is a continuation of application No. 09/366,359, filed on Aug. 3, 1999, now Pat. No. 6,370,233.

(51) Int. Cl.
*H01R 33/96* (2006.01)

(52) U.S. Cl.
USPC ................................. 379/37; 379/42; 379/38

(58) Field of Classification Search
USPC .................. 379/37, 38, 42, 211.02
See application file for complete search history.

(56) References Cited

U.S. PATENT DOCUMENTS

| | | | |
|---|---|---|---|
| 3,793,487 A | 2/1974 | Kilby | |
| 4,107,466 A | 8/1978 | Churchill | |
| 4,503,288 A | 3/1985 | Kessler | |
| 4,578,540 A | 3/1986 | Borg et al. | |
| 4,612,419 A | 9/1986 | Smith | |
| 4,665,544 A | 5/1987 | Honda et al. | |
| 4,856,072 A | 8/1989 | Schneider et al. | |
| 5,031,205 A | 7/1991 | Phillips | |
| 5,086,385 A | 2/1992 | Launey et al. | |
| 5,166,972 A | 11/1992 | Smith | |
| 5,274,698 A | 12/1993 | Jang | |
| 5,315,636 A | 5/1994 | Patel | |
| 5,363,425 A \* | 11/1994 | Mufti et al. | ............. 379/201.06 |
| 5,402,469 A | 3/1995 | Hopper et al. | |
| 5,440,620 A | 8/1995 | Slusky | |
| 5,479,496 A | 12/1995 | Endo et al. | |
| 5,596,633 A | 1/1997 | Meier et al. | |

(Continued)

FOREIGN PATENT DOCUMENTS

| | | |
|---|---|---|
| JP | 362073846 A | 4/1987 |
| JP | 04334158 A | 11/1992 |
| JP | 08116355 A | 5/1996 |
| JP | 10098521 A | 4/1998 |

*Primary Examiner* — Alexander Jamal
(74) *Attorney, Agent, or Firm* — Toler Law Group, PC

(57) ABSTRACT

A security system with call management functionality includes a security controller having at least one first interface to at least one user identification device and a second interface to a call management controller. The security controller also includes logic to determine a security status of a user based on identification information received from the at least one user identification device and to communicate the security status of the user to the call management controller. The call management controller enables, disables, or modifies a communication service based on the security status of the user.

20 Claims, 1 Drawing Sheet

(56) References Cited

U.S. PATENT DOCUMENTS

| | | |
|---|---|---|
| 5,621,662 A | 4/1997 | Humphries et al. |
| 5,682,142 A | 10/1997 | Loosmore et al. |
| 5,689,235 A | 11/1997 | Sugimoto et al. |
| 5,712,911 A | 1/1998 | Her |
| 5,724,411 A | 3/1998 | Eisdorfer et al. |
| 5,802,157 A | 9/1998 | Clarke et al. |
| 5,901,211 A | 5/1999 | Dean et al. |
| 5,995,597 A | 11/1999 | Woltz et al. |
| 6,002,427 A | 12/1999 | Kipust |
| 6,005,870 A | 12/1999 | Leung et al. |
| 6,161,128 A | 12/2000 | Smyk |
| 6,263,064 B1 | 7/2001 | O'Neal et al. |
| 6,345,047 B1 | 2/2002 | Regnier |
| 6,356,752 B1 | 3/2002 | Griffith |
| 6,370,233 B1 | 4/2002 | Bennett, III et al. |
| 6,370,235 B1 | 4/2002 | Heiner |
| 6,418,216 B1 | 7/2002 | Harrison et al. |
| 6,490,444 B1 | 12/2002 | Bossemeyer, Jr. et al. |
| 6,549,612 B2 | 4/2003 | Gifford et al. |
| 7,167,543 B2 | 1/2007 | Bennett, III et al. |
| 2002/0121969 A1* | 9/2002 | Joao .................. 340/425.5 |
| 2007/0274461 A1 | 11/2007 | Bennett, III et al. |

* cited by examiner

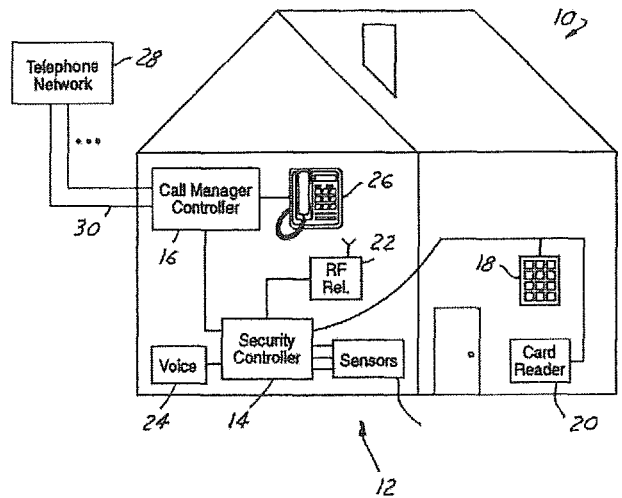
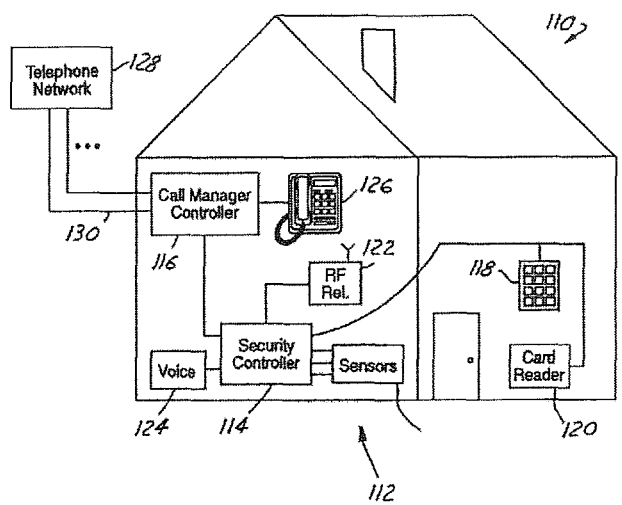
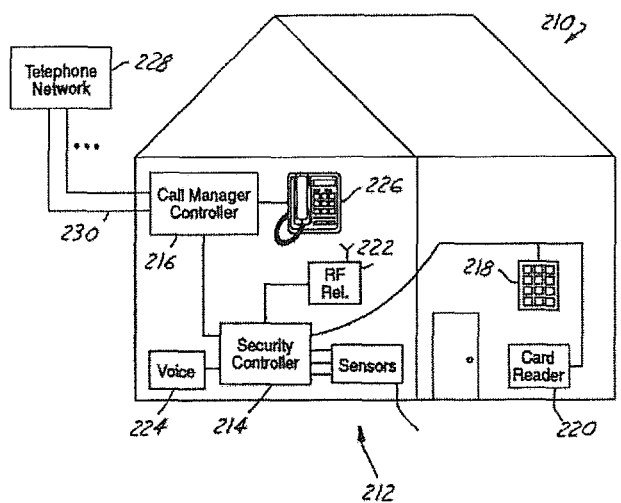

SECURITY SYSTEM WITH CALL MANAGEMENT FUNCTIONALITY

CLAIM OF PRIORITY

The present application claims priority from and is a continuation of U.S. patent application Ser. No. 11/605,675, filed on Nov. 29, 2006 and entitled "Security System With Call Management Functionality," which is a continuation of U.S. patent application Ser. No. 10/017,989 filed on Dec. 6, 2001, now U.S. Pat. No. 7,167,543, which is a continuation of U.S. patent application Ser. No. 09/366,359 filed on Aug. 3, 1999, now U.S. Pat. No. 6,370,233, the contents of which are expressly incorporated herein by reference in their entirety.

FIELD OF THE DISCLOSURE

The present disclosure relates generally to security systems and more particularly to a security system with call management functionality.

BACKGROUND

Because of increased security concerns many homeowners have a home security system. Many of these home security systems can be configured so that each resident is assigned a unique passcode. In operation, these individual passcodes can be used to change security system status or make ad hoc changes to system parameters. For example, security system status is commonly changed from "standby" to "arm" when the occupants are away. Similarly, system parameters are commonly changed to, for example, permit the security system to be in "night mode" even though there are open windows.

Security systems receive passcodes a number of different ways. Typically, a security system receives passcodes and system commands through a keypad. Recently, however, it has been suggested that security systems receive passcodes and system commands a variety of ways. For example, a user could be identified automatically by carrying a transponder, or by using a magnetically coded house key, or by using voice recognition.

Besides home security systems, many homeowners subscribe to a variety of call management services. These services range from call waiting and caller ID, to voice mail and restricted 900 number access. These services are not typically related to any individual's presence in the home. A number of additional services could be provided to a homeowner if these call management services were integrated with a home security system.

BRIEF DESCRIPTION OF THE DRAWINGS

FIG. 1 is a block diagram of a house having a security system with call management functionality according to the present disclosure.

DETAILED DESCRIPTION

The present disclosure is generally directed to a security system with call management functionality. In a particular embodiment, the security system includes a security controller having at least one first interface to at least one user identification device and a second interface to a call management controller. The security controller also includes logic to determine a security status of a user based on identification information received from the at least one user identification device and to communicate the security status of the user to the call management controller, where the call management controller enables, disables, or modifies a communication service based on the security status of the user.

In another particular embodiment, the disclosure is directed to a call management controller having an interface to a security controller and logic to receive a security status of a user from the security controller and to enable, disable, or modify a telephone service based on the security status of the user.

Referring to FIG. 1, a block diagram of a house 10 having a security system 12 with call management functionality according to the present disclosure is illustrated. Security system 12 is located in house 10 and includes two major components comprising a security controller 14 and a call management controller 16.

Security controller 14 is located in house 10 and is coupled to a plurality of sensors 18 to provide security system functions. The security controller 14 and sensors 18 are conventional. For example, sensors 18 are located in various positions in house 10 and include window and door position sensors and motion detectors to detect unauthorized entry into house 10. Security controller 14 is also coupled to several devices that are used for user identification and system commands. Additionally, security controller 14 is conventionally also tied to a phone line to contact 911 or a monitoring center. Each user of security system 12 has a unique ID or passcode.

Call management controller 16 is located in house 10 and is coupled to at least one handset 26 and a telephone network 28, which provides at least one phone line 30. Call management controller 16 is also coupled to security controller 14. By using information from security controller 14, call management controller 16 can provides a variety of new call management services as is more fully described below.

In the present invention, user identification is accomplished through a keypad 18, a card reader 20, a radio frequency receiver 22, a voice processing system 24 or the like. Keypad 18 can be located anywhere in house 10 and identifies users and changes system settings through input of unique passcodes and command codes. Card reader 20 is usually located near an entrance to house 10 and identifies users through a magnetically coded door key that is unique to each user. Radio frequency receiver 22 is located so that it can receive a signal from a unique transponder (not pictured) carried by any user of security system 12. Users are identified through communication between the individual transponder and radio frequency receiver 22. Voice processing system 24 is located so that it can receive voice commands from security system users. Voice processing system 24 includes a speaker verification module to identify individual users and a speech recognition module to process verbal commands.

The user identification devices allow security system 12 to identify individuals and monitor their presence in house 10. Thus, each individual not only has an identity, but also has a specific security status associated with their identity. Knowing which users are in house 10 and knowing each individual's security status and the security status of security system 12 allows call management controller 16 to define and customize call management services. These novel services can include night mode privacy, automated attendant, "follow me" service, "kid kontrol", "maid minder", and voice mail delivery.

In operation, the night mode privacy service functions in the following manner. When the security system 12 has been placed in night mode, all calls will be answered and the caller will be advised to leave a message unless it is an emergency. If the caller insists the call is important, the telephone 26 will ring. In the preferred embodiment, the telephone 26 will ring with a distinctive ring to denote an emergency call.

The automated attendant service functions in the following manner. Each user has a unique telephone number. When a call comes for a specific user, the telephone 26 rings as usual if the user is present in house 10. User presence is determined, as above, by the identification device. If the user is not present in house 10, an automated attendant offers to take a message without ringing telephone 26. If a call for a user known to be present in house 10 is not answered, then the automated attendant answers the call and takes a message. In this case, the automated attendant may also page the intended user, or ask the caller to hold the line and continue ringing telephone 26. If a user is on a call and another comes through, the user would get a call-waiting signal. Preferably, this call-waiting signal would be unique for each user.

The "follow me" service functions in the following manner. Multiple security systems may be interfaced to monitor several locations for user presence. In such a case, the security system distinguishes whether, for example, a user is occupying house 10, a neighbor's house 110 or a work location 210. Thus, the security system controller 14 is aware when the user leaves or enters a location. In this manner, calls are directed toward a telephone 26 nearest the user location. Alternatively, calls could be transferred to voice mail if the user is not present, or forwarded to a known location, such as a cellular or mobile phone or other location.

The "kid kontrol" service functions in the following manner. Because each individual not only has a unique identity, but also has a specific security status associated with their identity, the presence of only minor children in house 10 can be determined. When this is determined, outbound telephone calls can be restricted in one of several ways. For example, toll calls can be prohibited or limited in length, total number of calls can be limited, duration of individual calls or total time on telephone 26 could be limited, etc. Another example of this service is "maid minder" that will limit numbers or types of calls when only service personnel are in the residence.

The voice mail delivery service functions in the following way. When a user enters house 10 and is identified, the security system could notify them that they have voice mail, e-mail, facsimiles or other messages. The call management system 16 could then offer to deliver these messages. Preferably, voice-processing system 24 would verbally notify the user and commence playback of any messages. Alternatives include using a speaker integrated with keypad 18, where the user is notified of messages upon manual passcode entry. If the user's identity is established using some device that requires no active involvement by the user, i.e., a radio frequency receiver/transponder, then the voice mail delivery service rings telephone 26 and notifies the user that they have messages. Preferably, the voice mail delivery service uses a distinctive ring.

From the foregoing, it can be seen that there has been brought to the art a new and improved security system with call management functionality. It is to be understood that the preceding description is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A system comprising:
    a call management controller to configure a telephone service based on a security status of a user; and
    a first security controller configured to perform operations comprising:
        receiving first identification information of the user from a user identification device located at a first location;
        receiving second identification information of the user from a second security controller located at a second location that is remote from the first location;
        determining the security status of the user based on the first identification information and the second identification information, wherein the security status of the user indicates whether the user is present at one of the first location and the second location and whether outbound calling by the user is restricted; and
        communicating the security status of the user to the call management controller, wherein the call management controller and the first security controller are located at the first location.

2. The system of claim 1, wherein the call management controller is further configured to:
    receive the security status of the user from the first security controller;
    receive an incoming call associated with the user via an interface to a network; and
    route the incoming call based on the security status of the user.

3. The system of claim 2, wherein the incoming call is routed to a device located at the second location when the security status of the user indicates that the user is present at the second location.

4. The system of claim 2, wherein the incoming call is routed to a device located at the first location when the security status of the user indicates that the user is present at the first location.

5. The system of claim 2, wherein the incoming call is routed to a mobile communication device associated with the user when the security status of the user indicates that the user is not present at the first location and that the user is not present at the second location.

6. The system of claim 2, wherein the incoming call is routed to a voice mail service associated with the user when the security status of the user indicates that the user is not present at the first location and that the user is not present at the second location.

7. The system of claim 1, wherein the second security controller is located at a home location of the user, and wherein the first security controller is located at one of a work location of the user and a home location of a neighbor of the user.

8. The system of claim 1, wherein the first security controller is located at a home location of the user, and wherein the second security controller is located at one of a work location of the user and a home location of a neighbor of the user.

9. The system of claim 1, wherein the user identification device includes a keypad to receive entry of a user passcode, a card reading device to read a magnetic user identification card, a radio frequency receiver to receive a radio frequency signal from a transponder, a voice processing system to receive voice commands, or any combination thereof.

10. The system of claim 1, wherein the first security controller is further configured to provide a home security function based on home security information received from a security sensor, wherein the security sensor includes a door position sensor, a window position sensor, or a motion detector.

11. The system of claim 10, wherein the first security controller is further configured to contact a public safety answering point of an emergency-calling system or a private emergency monitoring center based on the home security information.

12. A call management controller, comprising;
   a first interface to a communication service network;
   a second interface to receive identification information from a plurality of security controllers associated with a plurality of security systems, wherein a first security system of the plurality of security systems is associated with a home location of a user, wherein the identification information includes first identification information and second identification information, wherein the first identification information is received from the first security system, and wherein the second identification information is received from a second security system located at a second location that is remote to the home location; and
   logic configured to:
      determine a security status of the user based on the first identification information and the second identification information, wherein the security status of the user indicates whether the user is present at one of the home location of the user and the second location and whether outbound calling by the user is restricted;
      communicate the security status of the user to a call management controller that is located at the home location; and
      enable, disable, or modify a phone service of the call management controller based on the security status of the user.

13. The call management controller of claim 12, wherein a particular security controller of the plurality of security controllers receives the identification information from a user identification device accessible to the particular security controller.

14. The call management controller of claim 12, wherein the telephone service includes a follow-me service, and wherein the logic is further configured to:
   receive an incoming call associated with the user via the first interface; and
   route the incoming call based on the security status of the user.

15. The call management controller of claim 14, wherein the logic routes the incoming call to a first device located at the home location of the user when the security status of the user indicates that the user is present at the home location, and wherein the logic routes the incoming call to a second device located at a second location when the security status of the user indicates that the user is present at the second location, wherein the second location is associated with a security controller of the plurality of security controllers.

16. The call management controller of claim 12, wherein each of the plurality of security controllers includes first interface to a security sensor, wherein the security sensor includes a door position sensor, a window position sensor, a motion detector, or any combination thereof, and wherein each of the plurality of security controllers further includes second interface to a communication path to contact a public safety answering point of an emergency-calling system or a private emergency monitoring center.

17. A method comprising:
   receiving, at a first security controller, first identification information of a user from a user identification device located at a first location;
   receiving, at the first security controller, second identification information of the user from a second security controller located at a second location that is remote from the first location;
   determining a security status of a user based on the first identification information and the second identification information, wherein the security status of the user indicates whether the user is present at one of the first location and the second location and whether outbound calling of the user is restricted;
   communicating the security status of the user to a call management controller that is located at the first location; and
   configuring a communication service of the call management controller based on the security status of the user.

18. The method of claim 17, further comprising:
   receiving, at the call management controller, an incoming call associated with the user via an interface to a communications network; and
   routing the incoming call based on a configuration of the communication service.

19. The method of claim 18, further comprising forwarding the incoming call to a device located at the second location when the security status indicates that the user is not present at the first location and when the security status indicates that the user is present at the second location, wherein the second location includes a work location, a neighbor location, a car location, or a business location.

20. The method of claim 18, wherein the communication service includes a night mode privacy service, an automated attendant service, a follow-me service, a kid control service, a maid minder service, a voice mail delivery service, or any combination thereof.

\* \* \* \* \*